US011736775B1

(12) United States Patent
Balest

(10) Patent No.: US 11,736,775 B1
(45) Date of Patent: Aug. 22, 2023

(54) ARTIFICIAL INTELLIGENCE AUDIO DESCRIPTIONS FOR LIVE EVENTS

(71) Applicant: Amazon Technologies, Inc., Seattle, WA (US)

(72) Inventor: Adam M. Balest, Lake Forest Park, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/643,569

(22) Filed: Dec. 9, 2021

(51) Int. Cl.
*H04N 21/81* (2011.01)
*H04N 21/2187* (2011.01)
*G06V 20/40* (2022.01)
*H04N 21/84* (2011.01)

(52) U.S. Cl.
CPC ......... *H04N 21/8106* (2013.01); *G06V 20/42* (2022.01); *G06V 20/46* (2022.01); *H04N 21/2187* (2013.01); *H04N 21/84* (2013.01)

(58) Field of Classification Search
CPC .......... H04N 21/8106; H04N 21/2187; H04N 21/84; G06V 20/46; G06V 20/42
See application file for complete search history.

(56) References Cited

U.S. PATENT DOCUMENTS 11,301,684 B1 * 4/2022 Kumar .................... G06V 20/41
2021/0089780 A1 * 3/2021 Chang .................... G06V 20/46

* cited by examiner

*Primary Examiner* — Nnenna N Ekpo
(74) *Attorney, Agent, or Firm* — Weaver Austin Villeneuve & Sampson LLP

(57) ABSTRACT

Methods and apparatus are described for generating audio descriptions of live events in near real time. Visual elements are identified in video frames. Semantic representations of the visual elements are determined and used to generate an audio description. The audio description is provided to a client device for playback during the live event as an alternative to the original audio content.

20 Claims, 4 Drawing Sheets

ARTIFICIAL INTELLIGENCE AUDIO DESCRIPTIONS FOR LIVE EVENTS

BACKGROUND

Video content may be provided through a number of media, such as television and the Internet. Live events (e.g., sporting events or concerts) may be streamed in real time by providing live manifests throughout the event on the most recently encoded fragments available. Some consumers may be visually impaired or otherwise desire to use audio descriptions that describe actions in the live event.

DETAILED DESCRIPTION

This disclosure describes techniques for generating audio descriptions of live events. Live events, (e.g., sports and concerts) typically include providing segments of a media presentation of the live event to a client device for playback in near real time to the live event. Audio descriptions are a form of audio-visual translation that may be used by visually impaired consumers of media content. Typically, audio descriptions are generated either after the event, such that they are unavailable in real time, or during the event with significant delay relative to the content being described. In some cases, audio descriptions may be an audio description of a closed captioning description of an event, which is typically produced by a person that views and describes the content in real time. The use of humans to generate these audio descriptions, however, is time-consuming and costly.

To improve the experience of consumers that use audio descriptions, disclosed herein are techniques for automatically generating audio descriptions for live events in near real time. Video frames are analyzed to determine visual elements that are relevant to the live event and audio descriptions of such visual elements are generated. The audio descriptions may then be provided to a client device as alternative audio content for the live event. An example may be instructive.

Figure 1A:
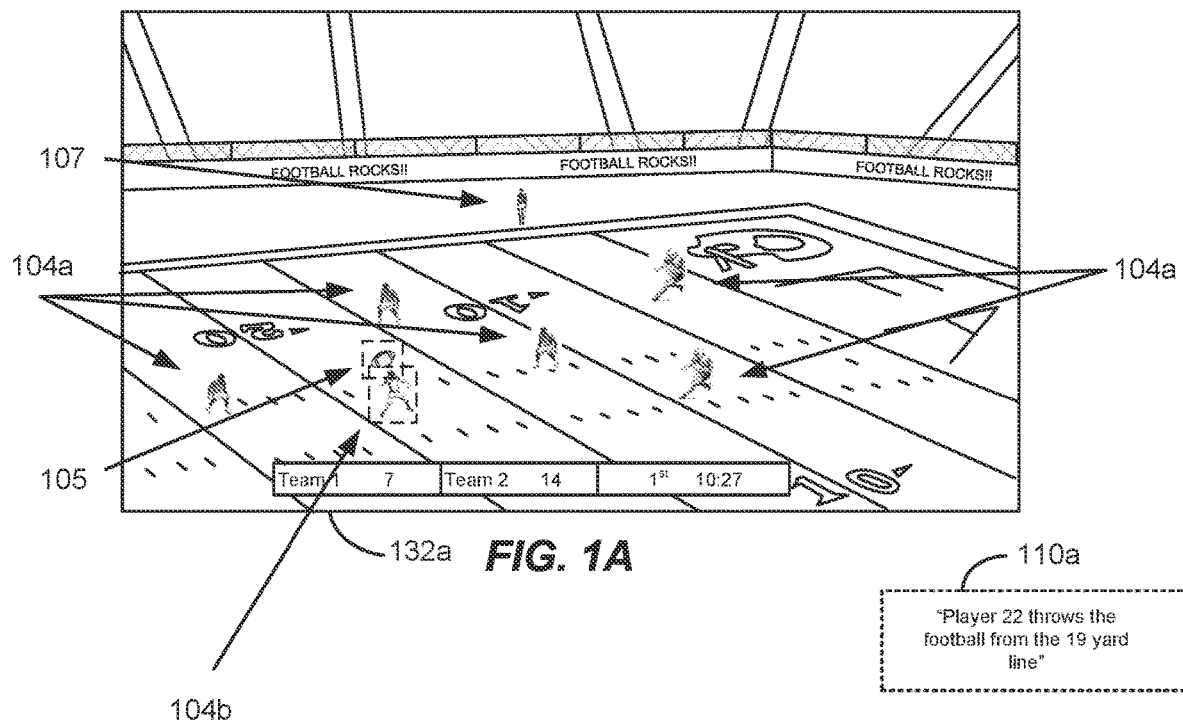
FIGS. 1A and 1B illustrate an example of a particular class of implementations for generating audio descriptions of a live event.
Figure 1B:
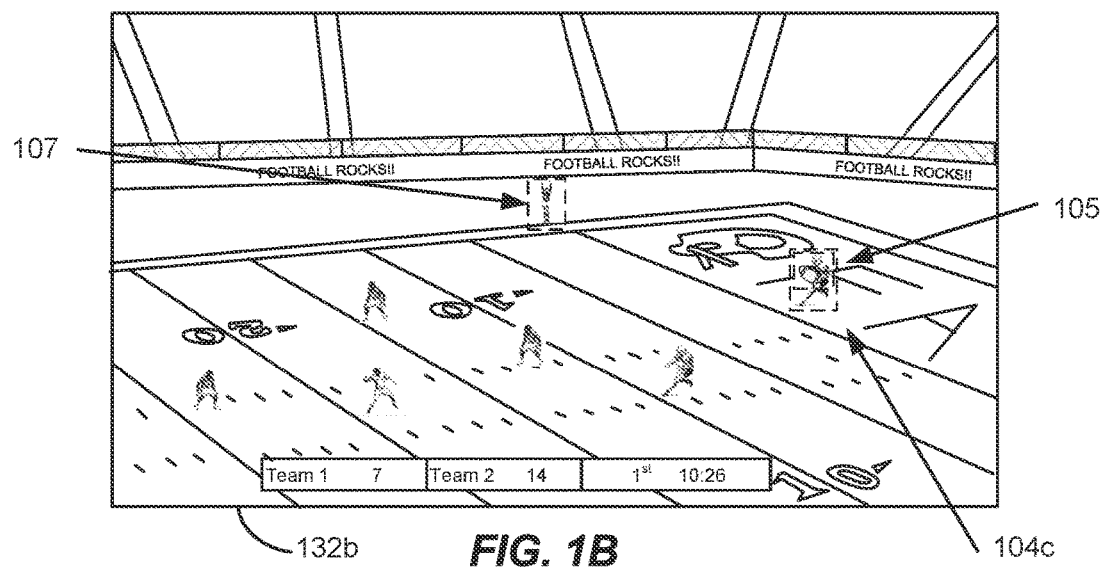

FIG. 1A and 1B present an example of audio descriptions of a live event. In FIG. 1A, Frame 132a is an off-axis view of a live event including players 104a, a referee 107, and a game object 105. A player 104b has possession of the game object 105 (e.g., a football), and in frame 132a is shown as throwing the game object 105. Frame 132a may be analyzed to identify the player 104b and game object 105 as visual elements, the location of the player 104b, and an action by player 104b: throwing the game object 105. This analysis may be performed using one or more machine learning models, e.g., a classifier or neural network. The machine learning models also determine a semantic representation that corresponds to the visual elements and is shown in audio description 110a. The semantic representations may include "player 22," "ball thrown," "19 yard line." Audio description 110a provides a description of the event of throwing the ball, stating "Player 22 throws the ball from the 19 yard line." This audio description is based on the semantic representations of the visual elements identified by the machine learning model. In some implementations, an audio description for a semantic representation is pre-recorded for certain visual elements, e.g., "player xx [throws/passes] the ball." As the relevant audio is already recorded, an audio description may be generated in real time based on the semantic representations output by the machine learning models.

FIG. 1B presents a frame 132b that is after frame 132a. In frame 132b, the game object 105 has been caught by a player 104c. Frame 132b is also analyzed by one or more machine learning models to identify visual elements and determine a semantic representation of the visual elements. Audio description 110b provides a description of the event of catching the ball, stating "Player 47 has caught the ball in the endzone." This audio description may be based on identifying the player 104c that has the game object, identifying the location of the player 104c on the game field, and identifying the action of catching the game object 105.

Furthermore, audio description 110b may also include "referee signals touchdown." The machine learning models may determine that the visual element of the referee 107 in frame 132b is relevant to the action of the sport or affects the game state of the sport. Here, the referee is signaling a score by a team, however other signals by referees may be made, e.g., throwing a yellow flag and/or signaling a foul. In frame 132a the referee is not making a signal, and thus is not affecting the game state. Thus, audio description 110a does not include a semantic representation of the referee or an action by the referee in frame 132a.

Notably, audio descriptions 110a and 110b may be generated without requiring a person to view and caption the content. Furthermore, audio descriptions 110a and 110b may omit non-relevant details or otherwise prioritize actions. As noted above, an audio description of the referee in frame 132a is not generated, as the referee's actions in frame 132a do not affect the game state. In some implementations, the referee may be identified as a visual element, but a semantic representation is not generated based on a lack of a corresponding action visual element associated with the referee. In FIGS. 1A and 1B other players besides player 104b and 104c are on the field. However, as they do not interact with the game object, they are not included in the audio description for those frames. Similarly, any actions or emotions by a referee, coach, cheerleader, game fan, or other persons that do not affect the game state may be omitted from the audio description. In some implementations, the machine learning models may be trained to determine which visual elements to identify and generate semantic representations for. In FIG. 1A and 1B, the machine learning models identifies visual elements related to a football game object. In some implementations, the machine learning models may also identify and determine a semantic representation for other game object visual elements, e.g., a referee throwing a yellow flag.

Figure 2:
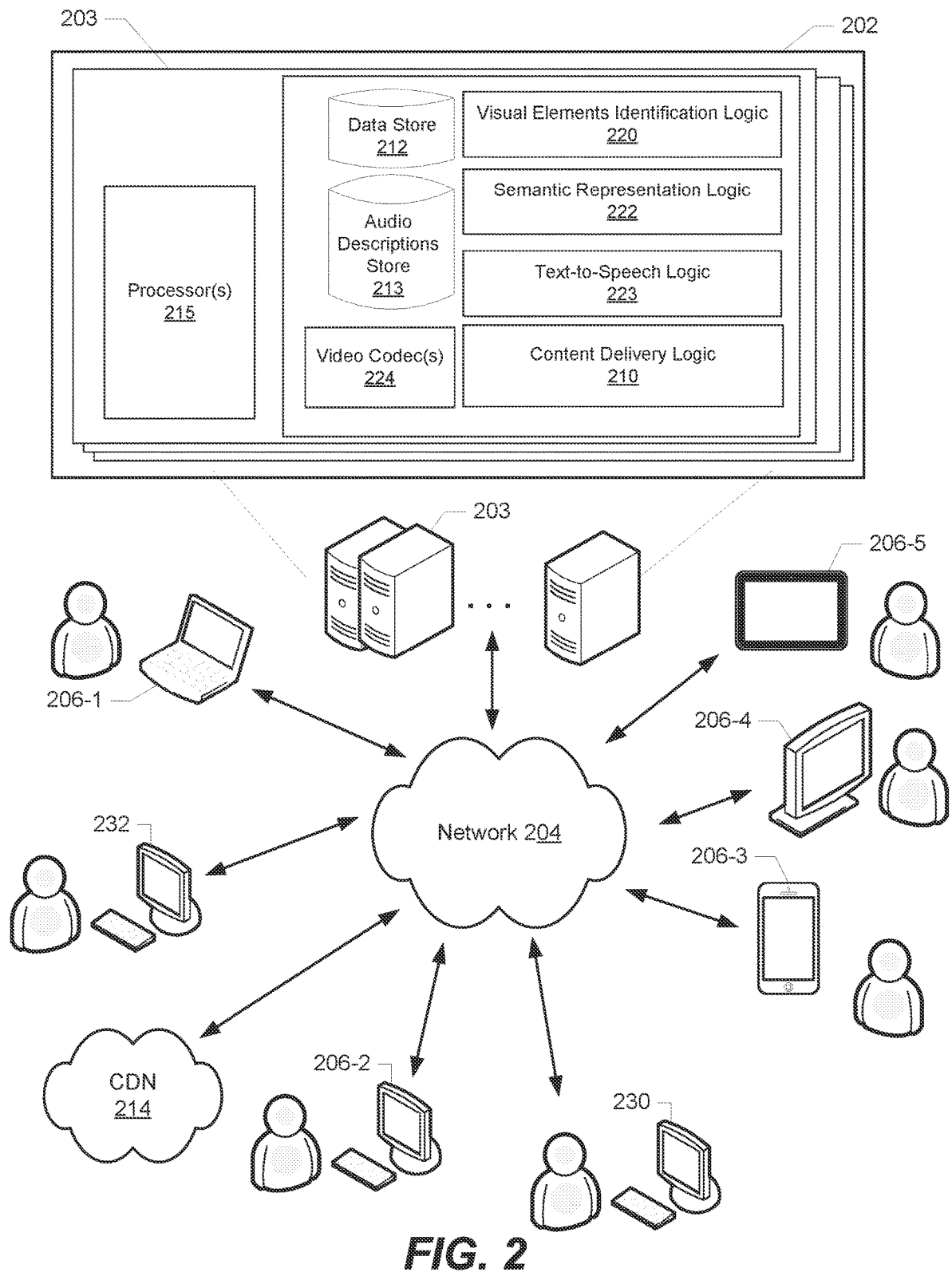
FIG. 2 illustrates an example of a computing environment in which implementations enabled by the present disclosure may be practiced.

FIG. 2 illustrates an example of a computing environment in which a video content service 202 provides streaming content for a live event (e.g., video and/or audio) via network 204 to a variety of client devices (206-1 through 206-5) in accordance with the techniques described herein. In various implementations, the streaming content may be a video presentation of a live event (e.g., a livestream, broadcast, and/or camera feed of an ongoing live event and/or a recording of a partially or fully-completed event which may also be referred to as formerly-live event). Content service 202 may conform to any of a wide variety of architectures such as, for example, a services platform deployed at one or more co-locations, each implemented with one or more servers 203. Servers 203 can include one or more processors 215, memory, and other hardware for performing the tasks disclosed herein. Network 204 represents any subset or combination of a wide variety of network environments including, for example, TCP/IP-based networks, telecommunications networks, wireless networks, satellite networks, cable networks, public networks, private networks, wide area networks, local area networks, the Internet, the World Wide Web, intranets, extranets, etc. Client devices 206 may be any suitable device capable of connecting to network 204 and consuming streaming content provided by service 202. Such devices may include, for example, mobile devices (e.g., cell phones, smart phones, and tablets), personal computers (e.g., laptops and desktops), set top boxes (e.g., for cable and satellite systems), smart televisions, gaming consoles, wearable computing devices, etc.

Content service 202 may encode (using video codecs 224) captured video of a live event for delivery as a plurality of live streams that include different quality-level and bitrate versions of the content, delivered according to a number of streaming protocols including, for example, HTTP Live Streaming (HLS), Dynamic Adaptive Streaming over HTTP (DASH), Sye streaming, and Smooth Streaming. Live streaming clients (e.g., device 206-1) consume the live content (delayed only a few seconds from the live action) using live manifests that are periodically made available by content service 202 as additional content is encoded and packaged. Fragments of content are then delivered over network 204

At least some of the examples described herein contemplate implementations based on computing models that enable ubiquitous, convenient, on-demand network access to a shared pool of computing resources (e.g., networks, servers, storage, applications, and services) to provide streaming content. As will be understood, such computing resources may be integrated with and/or under the control of the same entity, e.g., the entity controlling content service 202. Alternatively, such resources may be independent of content service 202, e.g., on a platform under control of a separate provider of computing resources with which content service 202 connects to consume computing resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular streaming protocols herein are merely by way of example. Suitable alternatives known to those of skill in the art may be employed.

In the following examples and for the sake of simplicity, content service 202 is described as if it is integrated with or includes the platform(s) that provides primary content and audio descriptions to client devices. However, it will be understood that content service 202 may provide access to primary and/or audio descriptions content in conjunction with one or more content delivery networks (e.g., CDN 214) that may or may not be independent of content service 202. In addition, the source(s) of one or both of the primary content and the replacement content may be independent of or integrated to various degrees with content service 202. Implementations are contemplated in which content may be stitched and/or encoded, and/or metadata manipulated by a service that is integrated with a content service (e.g., 202), by a service associated with the content provider, or as a third-party service. The range of variations known to those of skill in the art are contemplated to be within the scope of this disclosure.

Implementations enabled by the present disclosure contemplate logic resident on the client devices consuming video content from content service 202. Client devices may have logic to request alternative audio streams, such as an audio description stream as described herein. Such logic might be part of an existing algorithm or module on the client device or implemented to work in conjunction with such an algorithm or module.

Content service 202 includes content delivery logic 210 that facilitates at least some aspects of content delivery to client devices 206. In some implementations, content delivery logic 210 facilitates providing segments of a live event, including video segments and audio segments, as well as alternative audio segments having audio descriptions of the video segments.

Content service 202 may also include visual elements identification logic 220 configured to analyze video segments and identify visual elements within the video segments. Content service 202 may also include semantic representation logic 222 that determines a semantic representation of the visual elements, e.g., the nouns, verbs, grammar, etc., that represent the visual elements. Content service 202 may also include text-to-speech logic that generates audio content based on semantic representations. Service 202 can also further include one or more video codecs 224, which may be used to encode media segments at one or more quality levels.

Content service 202 may further include audio descriptions store 213 that include audio files for each combination of semantic representations. For example, prior to a sporting event an audio file of the name of each player may be provided to audio descriptions store 213, such that an audio description of a particular player taking an action can be generated based on a semantic representation of a video frame stating that player taking the action. Audio descriptions store 213 may interface with text-to-speech logic 223 to generate and store audio descriptions based on the semantic representations.

Content service 202 may also include a variety of information related to primary content. The information can include the primary content, associated metadata, and manifests in data store 212 to which service 202 provides access. Alternatively, such information associated with and/or about the content, as well as the content itself may be provided and/or hosted by one or more separate platforms, e.g., CDN 214 or remote cloud storage. It should be noted that, while logic 210, 220, 222, and 225, and data store 212 and 213 are shown as integrated with content service 202, implementations are contemplated in which some or all of these operate remotely from the associated content service, and/or are under the control of an independent or more loosely integrated entity. From these examples, those of skill in the art will understand the diversity of use cases to which the techniques described herein are applicable.

Figure 3:
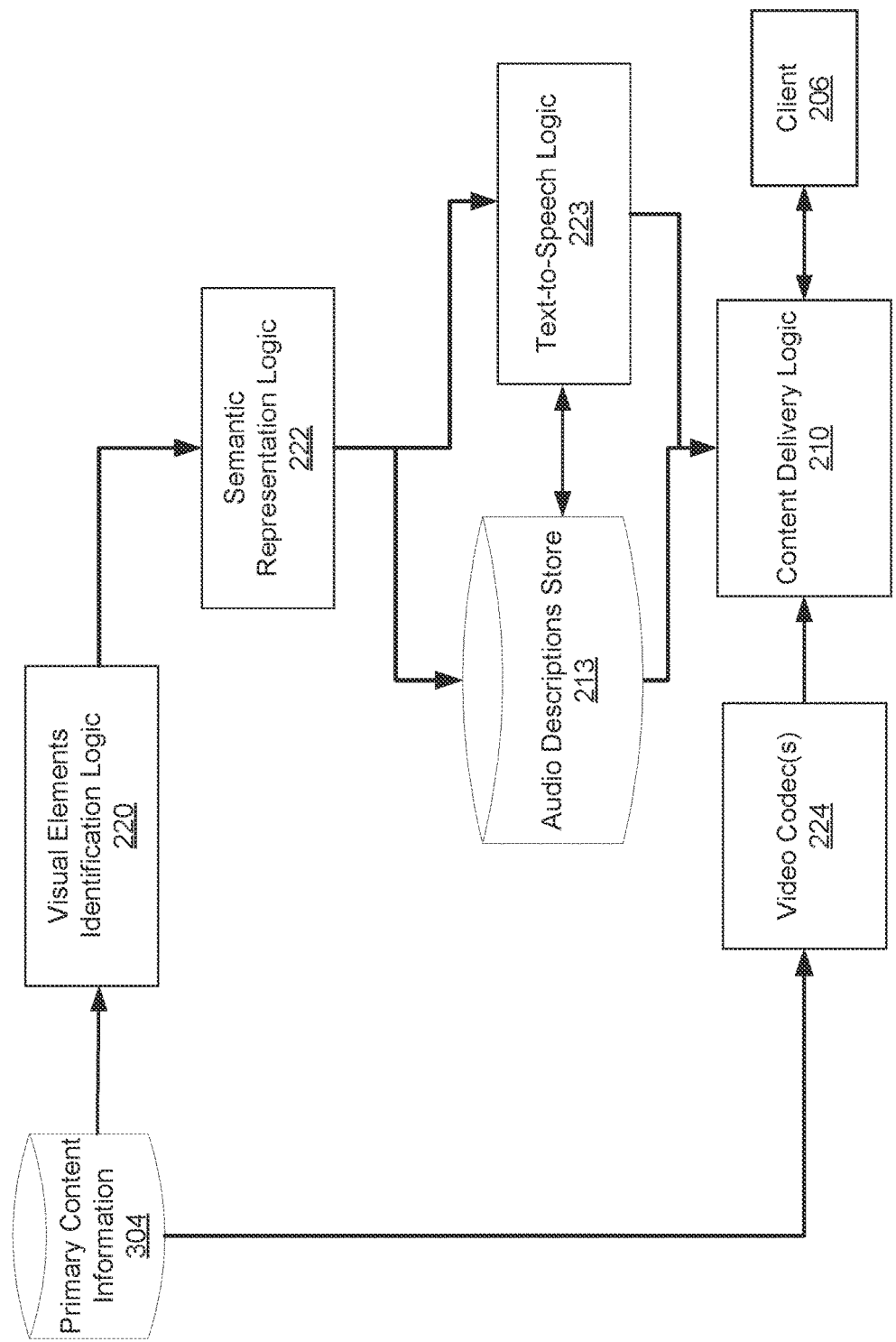
FIGS. 3 presents a flowchart illustrating operations of examples of implementations as described herein.

FIG. 3 is a block diagram of an implementation of a content delivery system as enabled by the present disclosure. Visual elements identification logic 220 accesses primary content information 304, which it analyzes to identify visual elements in video frames of the live content. Primary content information 304 can include segments and manifests for a live event as well as video files for video on demand (VOD) content. Specifically, primary content information 304 can include, for live events, each of the manifests and updated manifest data along with corresponding segments of the live event. For VOD content, primary content information 304 may store each video title of a video content library, a video content item including one or more video files containing video content. For example, a video content item can include a movie or episode of a television show.

In some implementations, visual elements identification logic 220 applies a set of algorithms which may include, for example, machine learning (ML) algorithms and/or computer vision techniques to aid in the analysis of primary content information 304. More particularly, computer vision techniques may be applied to identify visual elements in frames. For example, computer vision techniques can be applied to frames of a media segment to identify players, referees, coaches, game objects, etc., in a frame. In some implementations, the tracking operations performed by the visual elements identification logic 220 may use a deep-learning based algorithm referred to as DeepSORT (SORT: Simple Real time Tracker). In some implementations, the detecting operations performed by the visual elements identification logic 220 may be based on Common Objects in Context (COCO) datasets. COCO is a large-scale object detection, segmentation, and captioning dataset, and images in the dataset may be everyday objects captured from everyday scenes. The detection operations may be trained using YOLOv3 model (YOLO: You Only Look Once). In some implementations, the COCO dataset may be finetuned using a custom dataset for a particular sporting event such as, for example, football or soccer. The visual elements identification logic 220 may use motion and appearance features extracted from the visual elements to perform frame by frame data association and track generation.

In some implementations, visual elements identification logic 220 may include a classifier that is trained to output a probability for each of a plurality of visual elements that visual element is present in the frame or segment. In some implementations the classifier is trained on segments that correspond with a plurality of visual elements, e.g., persons, objects, actions, and/or emotions, e.g., segments labeled "quarterback," "football," "forward pass," "yellow flag," or "angry." The classifier may output a probability for each visual element. It should be understood that multiple classifiers may also be used. A classifier may undergo supervised learning on segments labeled as "throwing," which, together with training on identifying a football, the classifier learns to map to a visual element of "throwing a football." In some implementations the classifier may be a neural network, including a convolutional neural network or recurrent neural network. In some implementations, the visual element may be identified based on the highest probability output by the classifier.

In some implementations, visual elements identification logic may also identify visual elements to be ignored. For example, fans in the stands may be recognized as visual elements, but have a low relevance to the live event, particularly in that they don't affect the game state. In some embodiments, a classifier or other machine learning technique may be trained to identify visual elements that are to be ignored. In some embodiments, there may be a set of visual elements to ignore, such that when visual elements are identified as a part of that set, they are then ignored for determining semantic representations. This may be useful to reduce computational resources spent on visual elements that have a low relevance to the live event. In some embodiments, as visual elements may be tracked across frames, the visual elements to be ignored may be similarly tracked to reduce computational analysis of that portion of the video frame.

Semantic representation logic 222 determines semantic representations of the visual elements identified by visual elements identification logic 220. In some implementations, semantic representation logic 222 may apply a set of algorithms, including machine learning algorithms, to determine a semantic representation of the visual elements. In some implementations, a semantic representation may be a subject-action pair or a subject-action-object triplet, e.g., [a player] [throwing] [the football]. In some implementations the semantic representation logic may be trained to identify visual elements that do or do not affect the game state. In such implementations semantic representation logic may not generate semantic representations for visual elements that do not affect the game state. The semantic representation logic may effectually filter the visual elements to determine semantic representations for the visual elements that are relevant to the action of the sport or affect the game state. In some implementations, semantic representations may be a closed captioning of the live event based on identified visual elements.

Audio descriptions store 213 and text-to-speech logic 223 generate audio descriptions based on semantic representations. In some implementations, audio descriptions store 213 may store audio files that may be sampled to generate audio descriptions. In some implementations the audio files may include the pronunciation of particular players or particular actions. In some implementations, the audio files may be generated using text-to-speech logic 223. Text-to-speech logic 223 may use various techniques and algorithms for generating audio files based on text. In some implementations, audio files generated by text-to-speech logic 223 may be stored in audio descriptions store 213 for later use.

In some embodiments, audio descriptions store 213 may have sets of audio files that correspond to a type of the live event. A live event may be a particular type of game or sporting event, e.g., football or basketball. In some embodiments, a set of audio files for generating audio descriptions may correspond to the type of the live event. In such embodiments, that set of audio files may be retrieved for more efficient reference during the live event. In some embodiments, the set of audio files may be stored at an edge server that is part of a CDN to facilitate faster generation and delivery of audio descriptions.

Figure 4:
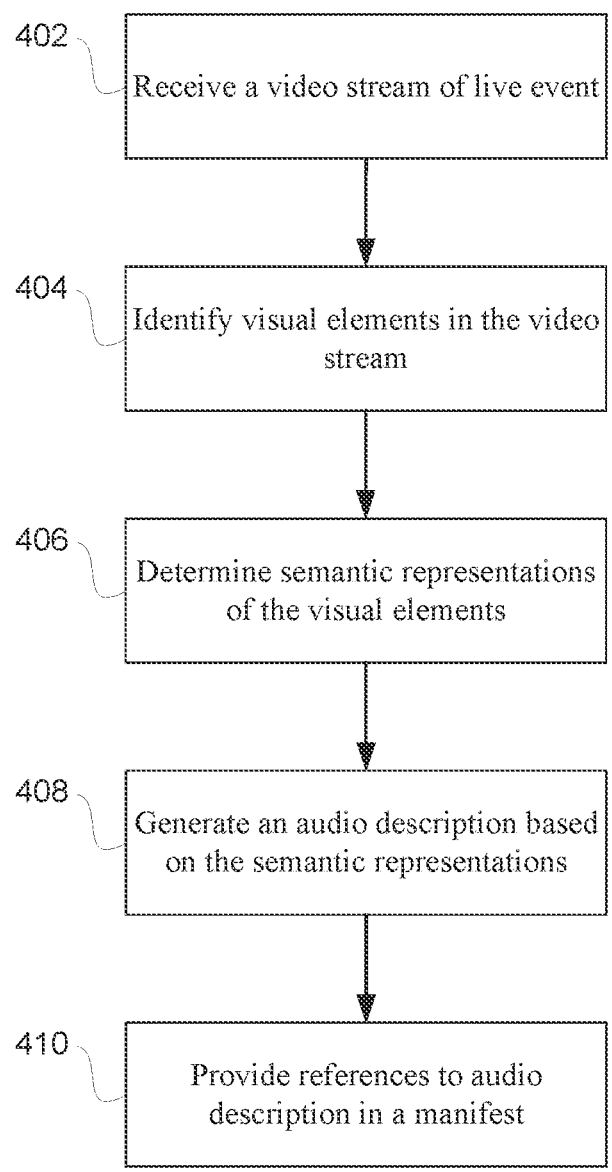
FIGS. 4 presents a flowchart illustrating operations for an example implementation of determining audio descriptions of a live event.

FIG. 4 presents a flow diagram for generating audio descriptions of a media presentation for live content. Operations of FIG. 4 may be performed by a server 203. In some implementations, operations described in FIG. 4 may be performed by different servers than those used to encode content. In some implementations, the operations of FIG. 4 may be performed for each segment and/or each video frame of a live event. The operations of FIG. 4 may be performed for a sequence of video frames to generate audio descriptions for that sequence. A video stream of a live event is received (402). In some implementations the video stream received may be a segment of a video stream, e.g., a two to ten seconds segment to be encoded according to an adaptive bitrate algorithm (ABR). As live content is received and encoded in near real time to the live event, in some implementations the audio descriptions may be generated to correspond with the segments that are packaged and delivered to client devices at the live head. In some implementations the segment may be longer or shorter than an ABR segment.

Visual elements in the video stream are identified (404). Visual elements may be identified using a machine learning model as described herein. Visual elements may include persons, objects, actions, and emotions that occur in the video frame. In some implementations, visual elements may be identified based on a relationship to a game object. For example, a football, flag, or card may be initially identified, and then persons associated with the game object are identified. In some implementations, a classifier or other machine learning model is used to analyze the video frame to identify visual elements. In some implementations, all visual elements in a frame are identified.

In some implementations, visual elements are identified based on effecting the game state. During a sporting event, players, coaches, and referees may take actions that affect the game state, e.g., throwing a football, calling a timeout, swapping players on the field, or calling a penalty. In some implementations a machine learning model is trained to identify such actions and the persons and/or objects associated with such actions. In some implementations, the machine learning model may recognize an emotion or reaction of a person, such as a close-up view of a player at the free throw line in a basketball game during a free throw.

In some implementations, visual elements may be identified based on a set of visual elements that correspond to the type of live event. The set of visual elements may be based on the type of the live event, e.g. basketball or football. The set of visual elements may include persons/objects, e.g., sports objects, players, coaches, referees, baskets/goals, playing field, as well as actions/emotions, e.g., throwing, catching, shooting, rebound, anger, excitement, frustration. In some embodiments, the set of visual elements may include prioritization or filtering information. Higher priority visual elements may be considered more relevant to the game, and thus are prioritized for generating semantic representations/audio descriptions. As an audio description for a fragment of video content may be unable to describe everything happening in that fragment, the visual elements may be identified based on the prioritization of the visual elements. While priority is described in reference to identifying visual elements, in some embodiments priority is referenced during a determination of semantic representations or during generation of audio descriptions. In some embodiments, filtering or prioritization may be performed by visual elements identification logic or semantic representations logic.

In some implementations, only a portion of a video frame is analyzed for visual elements. For example, audio descriptions may not be generated based on visual elements off a playing field, e.g., fans in the stands. Thus, in some implementations identifying visual elements may include identifying a region of a video frame. That region may be analyzed for visual elements, while portions of the video frame outside that region are not analyzed. This may improve throughput and help generate the audio descriptions in near real time with the live head. Various techniques for identifying regions in a frame may be used, including techniques described in U.S. pat. app. Ser. No. 17/448,039, titled CLIENT SIDE AUGMENTED REALITY OVERLAY, which is hereby incorporated herein for all purposes. Regions may include a playing field or a portion of a playing field.

Semantic representations are then determined for the visual elements (406). Semantic representations are words and/or phrases that describe the visual elements. In some implementations, semantic representations may follow an action-subject relationship. In some implementations a machine learning model outputs the semantic representation. In some implementations, a machine learning model trained to identify visual elements may also output a semantic representation. In other implementations, a separate machine learning model may receive the visual elements as input and output a semantic representation.

In some implementations semantic representations may be specific to a particular sport. For example, football, basketball, and soccer may use specific terminology for various actions during a game. The semantic representations for these actions may be specific to the game (e.g., "player 22 throws a forward pass," player 64 shoots from behind the three-point line"). In some implementations, a machine learning model is trained to output a particular semantic representation for a set of visual elements based on the type of live event. A defined feature set of semantic representations may be previously determined for a sporting event, which may then be selected and combined based on the visual elements identified in the video frames. For example, features of a set of semantic representations may include all of the signals that a referee may use during a football game, such that a visual element of a referee may be mapped to the corresponding signal.

In some implementations the visual elements may be filtered when determining semantic representations. As noted above, some visual elements may affect the game state while other visual elements do not (e.g., a referee watching a play vs. a referee signaling a penalty). In some implementations, semantic representations may be determined based on visual elements that affect game state, while semantic representations are not determined for visual elements that do not affect game state or otherwise are not relevant to the action of the sport.

Audio descriptions are generated based on the semantic representations (408). In some implementations, audio descriptions may be generated based on combining audio files that correspond to the semantic representations. In some implementations, audio descriptions may be pre-recorded that correspond to particular semantic representations, e.g., an audio description for each signal a referee may use, or an audio description for each sports play in a feature set of sports play. In some implementations, a feature set of audio descriptions may correspond to a feature set of semantic representations, such that each semantic representation in the feature set has a corresponding audio description. In such implementations, generating the audio description may include combining pre-recorded audio descriptions based on the semantic representations.

In some implementations, audio descriptions may be generated based on the semantic representations using a text-to-speech generation logic. In some implementations, the text-to-speech generation logic may be part of an audio descriptions store 213 or separate from the audio descriptions logic 213.

The audio descriptions are then provided to a client device (410). In some implementations, references to audio descriptions are included as part of a live manifest that is provided to client devices. The audio descriptions may be saved in a data store, where references to the audio descriptions may be provided to a packager that packages the live video content. The packager may package the live video content and audio descriptions for delivery to a client device. A client device may then have the option to select the audio description as an alternative audio track for playback with the video content.

As noted above, in some implementations, the audio descriptions may have a fragment size that is the same size as the video fragments. During a live event, closed captioning or audio descriptions typically lag the audio or video content being described, as a person is manually generating the closed captioning or audio descriptions. In some implementations, audio descriptions generated according to techniques disclosed herein may describe the video content in near real time to the video content. In some implementations, a fragment of audio description content may describe visual elements in video frames of a fragment of video content, where both fragments correspond to the same indices of a common media timeline. In some embodiments, each fragment of audio description content is delivered with and played back with a fragment of video content that is described by that fragment of audio description content. In some embodiments this results from the video content being encoded in parallel with the audio descriptions content, such that fragments for both are generated and packaged according to the same common media timeline.

In some implementations the method of FIG. 4 may only be implemented during an "active time" of the sport. Some sports may stop a game clock or only be played during a particular time period, e.g., downs of American football, serves of tennis, stopping the clock for a penalty in basketball. In some implementations, audio descriptions may be generated during active time of the sport to describe actions of the sport. During non-active time audio descriptions may not be used to allow for playback of audio by commentators discussing the sport.

Although implementations have been described in language specific to structural features and/or methodological acts, it is to be understood that the disclosure is not necessarily limited to the specific features or acts described. Rather, the specific features and acts are disclosed as illustrative forms of implementing the implementations. Conditional language, such as, among others, "can," "could," "might," or "may," unless specifically stated otherwise, or otherwise understood within the context as used, is generally intended to convey that certain implementations could include, while other implementations do not include, certain features, elements, and/or steps. Thus, such conditional language is not generally intended to imply that features, elements, and/or steps are in any way required for one or more implementations or that one or more implementations necessarily include logic for deciding, with or without user input or prompting, whether these features, elements, and/or steps are included or are to be performed in any particular implementation.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity.

Finally, although various advantages have been discussed herein with reference to various implementations, it will be understood that the scope of the invention should not be limited by reference to such advantages. Rather, the scope of the invention should be determined with reference to the appended claims.

What is claimed is:

1. A method, comprising:
   obtaining, during a live sporting event, video content of the live sporting event;
   identifying a plurality of visual elements within a sequence of video frames of the video stream using one or more machine learning models;
   determining a set of semantic representations based on the plurality of visual elements, wherein the set of semantic representations describes a player throwing a ball;
   generating an audio description based on the semantic representations;
   encoding the video content in parallel with generating the audio description;
   encoding audio content of the live sporting event;
   packaging the encoded video content, encoded audio content, and audio descriptions;
   providing a manifest having references to the encoded video content, encoded audio content, and audio descriptions to a client device;
   receiving a request for the video content and the audio description from the client device; and
   providing the video content and the audio description to the client device.

2. The method of claim 1, wherein the audio description is generated during an active game time of the live sporting event.

3. The method of claim 1, wherein the plurality of visual elements includes players, game objects, referees, coaches, a playing field, or any combinations thereof.

4. The method of claim 1, wherein the audio description is based on pre-recorded audio descriptions corresponding to the set of semantic representations.

5. A method, comprising:
   obtaining, during a live event, video content of the live event;
   identifying a plurality of visual elements within a sequence of video frames of the video content;
   determining a set of semantic representations, each semantic representation corresponding to one or more visual elements of the plurality of visual elements;
   generating an audio description of the sequence of video frames based on the semantic representations; and
   providing the audio description and the sequence of video frames to a client device.

6. The method of claim 5, wherein the plurality of visual elements includes players, game objects, referees, coaches, a playing field, or any combinations thereof.

7. The method of claim 5, wherein the visual elements are identified by one or more machine learning models.

8. The method of claim 7, wherein each of the one or more machine learning models is trained to output a probability that a different visual element is present in the sequence of video frames.

9. The method of claim 5, wherein the sequence of video frames corresponds to a first set of indices of a common media timeline, and wherein the audio description corresponds to the first set of indices of the common media timeline.

10. The method of claim 5, further comprising:
- determining that a first visual element has low relevance to the live event; and
- not generating a semantic representation of the first visual element.

11. The method of claim 5, wherein the audio description is generated in parallel with encoding of the video content.

12. The method of claim 5, wherein the audio description is based on pre-recorded audio descriptions corresponding to semantic representations.

13. A system, comprising one or more processors and one or more memories configured to:
- obtain, during a live event, video content of the live event;
- identify a plurality of visual elements within a sequence of video frames of the video content;
- determine a set of semantic representations, each semantic representation corresponding to one or more visual elements of the plurality of visual elements;
- generate an audio description of the sequence of video frames based on the semantic representations; and
- provide the audio description and the sequence of video frames to a client device.

14. The system of claim 13, wherein the plurality of visual elements includes players, game objects, referees, coaches, a playing field, or any combinations thereof.

15. The system of claim 13, wherein the visual elements are identified by one or more machine learning models.

16. The system of claim 15, wherein each of the one or more machine learning models is trained to output a probability that a different visual element is present in the sequence of video frames.

17. The system of claim 13, wherein the sequence of video frames corresponds to a first set of indices of a common media timeline, and wherein the audio description corresponds to the first set of indices of the common media timeline.

18. The system of claim 13, comprising one or more processors and one or more memories further configured to:
- determine that a first visual element has low relevance to the live event; and
- not generate a semantic representation of the first visual element.

19. The system of claim 13, wherein the audio description is generated in parallel with encoding of the video content.

20. The system of claim 13, wherein the audio description is based on pre-recorded audio descriptions corresponding to semantic representations.

\* \* \* \* \*